United States Patent
Bhat et al.

(10) Patent No.: US 12,148,137 B2
(45) Date of Patent: Nov. 19, 2024

(54) RECOMMENDATION ENGINE FOR COMPARING PHYSICAL ACTIVITY TO GROUND TRUTH

(71) Applicant: Sony Interactive Entertainment Inc., Tokyo (JP)

(72) Inventors: Udupi Ramanath Bhat, San Mateo, CA (US); Yasushi Okumura, San Mateo, CA (US); Fabio Cappello, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 126 days.

(21) Appl. No.: 17/745,873

(22) Filed: May 17, 2022

(65) Prior Publication Data
US 2022/0277438 A1    Sep. 1, 2022

Related U.S. Application Data

(63) Continuation of application No. 16/692,752, filed on Nov. 22, 2019, now Pat. No. 11,334,978.

(51) Int. Cl.
*G06T 7/00* (2017.01)
*A63B 24/00* (2006.01)
*G06N 3/02* (2006.01)
*G06T 7/73* (2017.01)
*G06V 40/20* (2022.01)

(52) U.S. Cl.
CPC ........ *G06T 7/0002* (2013.01); *A63B 24/0006* (2013.01); *A63B 24/0062* (2013.01); *G06N 3/02* (2013.01); *G06T 7/74* (2017.01); *G06V 40/23* (2022.01); *A63B 2024/0012* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 11,334,978 B2 * | 5/2022 | Bhat | A63B 24/0062 |
| 2018/0104541 A1 | 4/2018 | Katis, Jr. | |
| 2019/0362506 A1 * | 11/2019 | Leroyer | G09B 19/0038 |
| 2020/0111384 A1 | 4/2020 | Bell et al. | |
| 2021/0060385 A1 | 3/2021 | Karlsson | |

* cited by examiner

*Primary Examiner* — Leon Flores
(74) *Attorney, Agent, or Firm* — John L. Rogitz; John M. Rogitz

(57) ABSTRACT

A platform to accurately detect user pose/verify against a reference ground truth and provide feedback using an accuracy score that represents the deviation of the user pose from the reference ground truth, typically established by an expert.

16 Claims, 7 Drawing Sheets

RECOMMENDATION ENGINE FOR COMPARING PHYSICAL ACTIVITY TO GROUND TRUTH

FIELD

The application relates generally to technically inventive, non-routine solutions that are necessarily rooted in computer technology and that produce concrete technical improvements.

BACKGROUND

As understood herein, people who are interested in a physical activity such as golf or yoga can obtain guidance on proper technique using software applications executed by their personal computer or tablet computer or smart phone. However, feedback as to the correctness of a person's technique is difficult to obtain and convey without a live coach viewing the person or the person's image.

SUMMARY

Accordingly, a system includes at least one processor configured to access at least one computer storage with instructions executable by the processor to obtain video images of a person undertaking a physical activity. The instructions are executable to process the video images using at least one neural network to identify a type of the physical activity and based at least in part on the type of physical activity, access at least one ground truth representation. The instructions are further executable to compare the physical activity undertaken by the person as captured in the video images to the ground truth representation and to output a human-perceptible result of the comparison of the physical activity undertaken by the person as captured in the video images to the ground truth representation.

In some examples, the instructions are executable to obtain the video images of the person undertaking the physical activity using real time simple optical capture of video images of the person. The instructions can be executable to identify the type of the physical activity without the person wearing passive or active image capture tags.

In some implementations, the instructions are executable to identify the physical activity as yoga or golf. Other example physical activities that may be identified include dance, martial arts, boxing, and ballet.

The instructions may be executable to obtain the video images from a fusion camera system including a red-green-blue (RGB) imager and at least one of a depth imager or a thermal imager or both a depth imager and a thermal imager.

In some embodiments the ground truth representation is stored in at least one database of images of experts executing ground truth activities. The database may provide friends recommendations and progress reports in similar endeavors.

In example embodiments the human-perceptible result of the comparison of the physical activity undertaken by the person as captured in the video images to the ground truth representation includes a first image on a display of ground truth poses/motions from at least one expert and at least a second image of the user undertaking the physical activity. If desired, the human-perceptible result of the comparison can be output in real time such that the person can view the result of the comparison simultaneously within processing time constraints with undertaking the physical activity.

In another aspect, a method includes obtaining video images of a person undertaking a physical activity and accessing at least one ground truth representation of the physical activity. The method includes comparing information representing the physical activity undertaken by the person as captured in the video images to the ground truth representation. The method also includes outputting a human-perceptible result of the comparison of the physical activity undertaken by the person as captured in the video images to the ground truth representation.

In another aspect, an apparatus includes at least one computer storage medium comprising instructions executable by at least one processor to obtain video images of a person undertaking a physical activity, and process the video images using at least one neural network to generate information representing biomechanical features of the person undertaking the physical activity. The instructions can be executed to access at least one ground truth representation, compare the information representing biomechanical features to the ground truth representation, and output a human-perceptible result of the comparison.

The details of the present application, both as to its structure and operation, can best be understood in reference to the accompanying drawings, in which like reference numerals refer to like parts, and in which:

DETAILED DESCRIPTION

Figure 1:
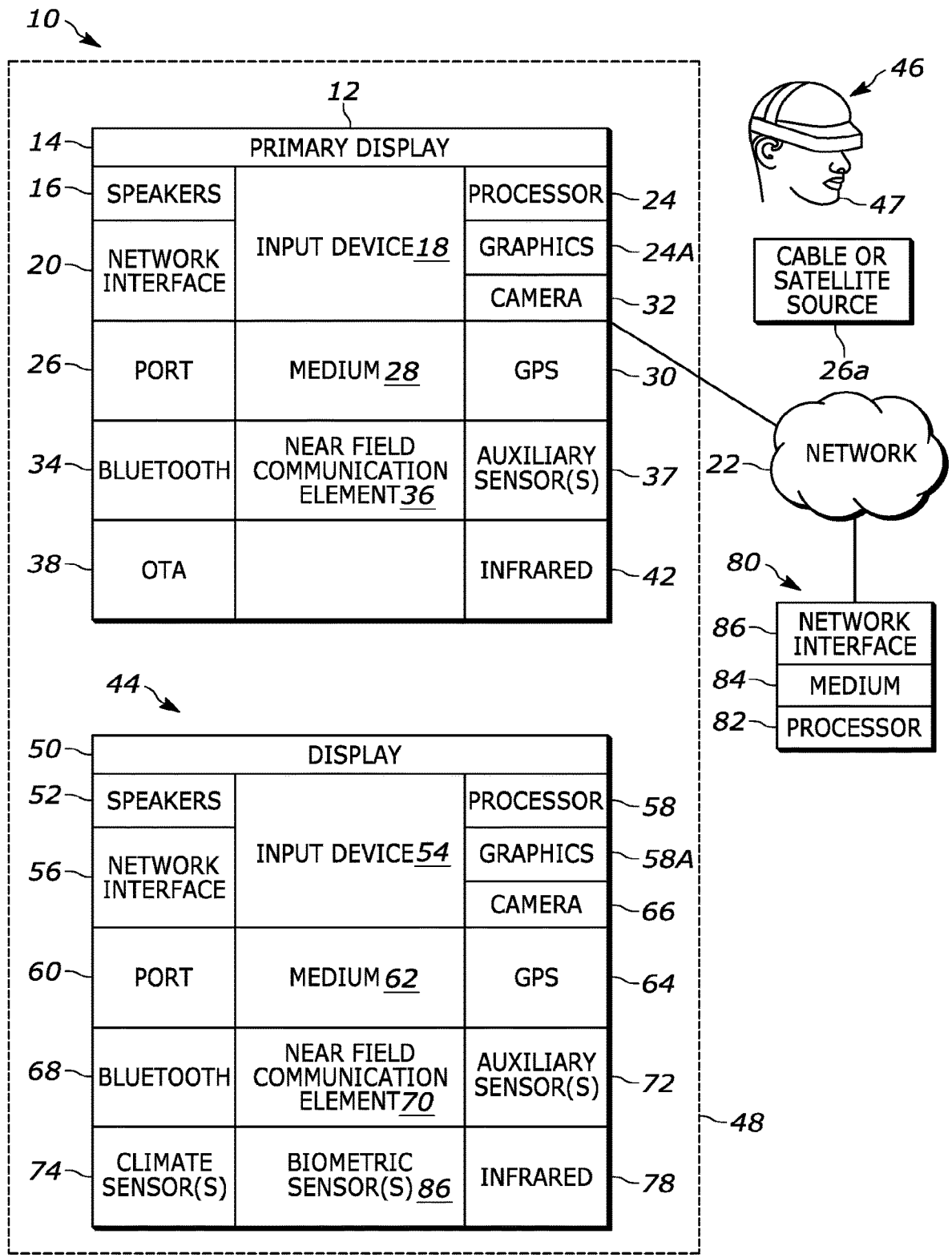
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
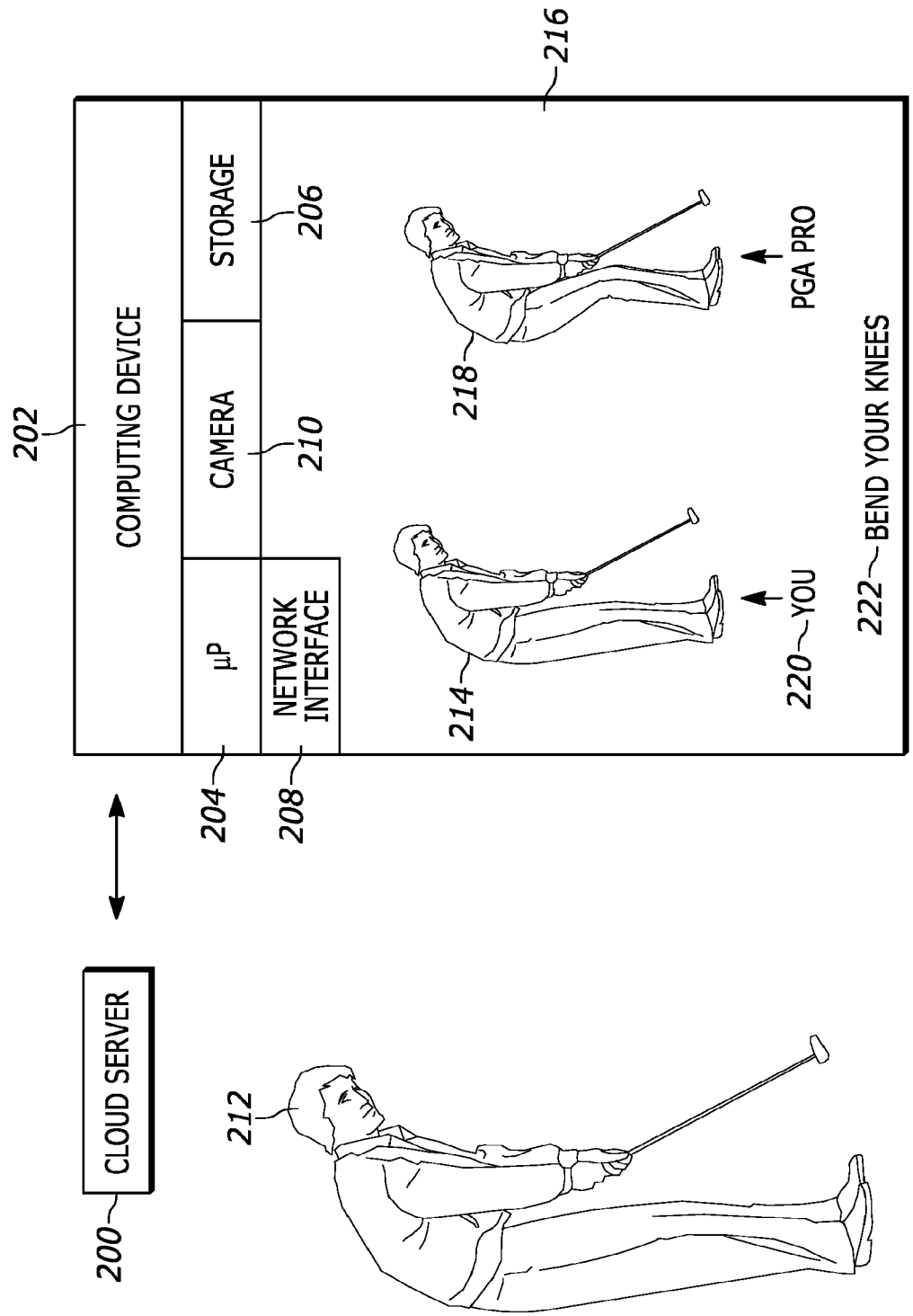
FIG. 2 schematically shows a person in a golf pose and a block diagram of an accompanying computing device to help train the person.

Now referring to FIG. 2, a cloud server 200 that may be implemented by the server 80 in FIG. 1 may communicate via a wide area network such as the Internet with a computing device 202 that may be implemented by any of the computing devices described herein and that may include any of the appropriate components discussed above. In the example shown, the computing device 202 may include one or more processors 204 accessing instructions on one or more computer storages 206 to execute techniques described herein. The computing device 202 may communicate with the server 200 using one or more network interfaces 208 such as any of the network interfaces described herein. Also, the computing device 202 may include one or more cameras 210 (or the camera 210 may be implemented by a separate imaging device). In one example, the camera 210 may provide for real time simple optical capture such as simple stereo of video images of a person 212.

In the example shown, the person 212 has assumed a golf pose. Still or video images 214 of the person 212 taken by the camera 210 may be presented on a display such as a display 216 of the computing device 202. If desired, still or video images 218 of an expert assuming the same golf pose/swing or other activity as the person 212 may also be presented on the display 216. The expert image 218 is referred to herein as "ground truth". Labels 220 may also be presented indicated that the image 214 is of the person 212 and that the image 218 is of an expert, in this case, a PGA professional golfer. An indication 222 of the deviation from ground truth of the person's pose/swing/movement may also be presented on the display 216. In the example shown, the indication 222 is alpha-numeric advice, in this case, "bend your knees", it being understood that other forms of the indication including graphical, audible, and tactile may be provided. The indication 222 may be derived using one or more neural networks discussed further below and analyzing the image of the person.

Figure 3:
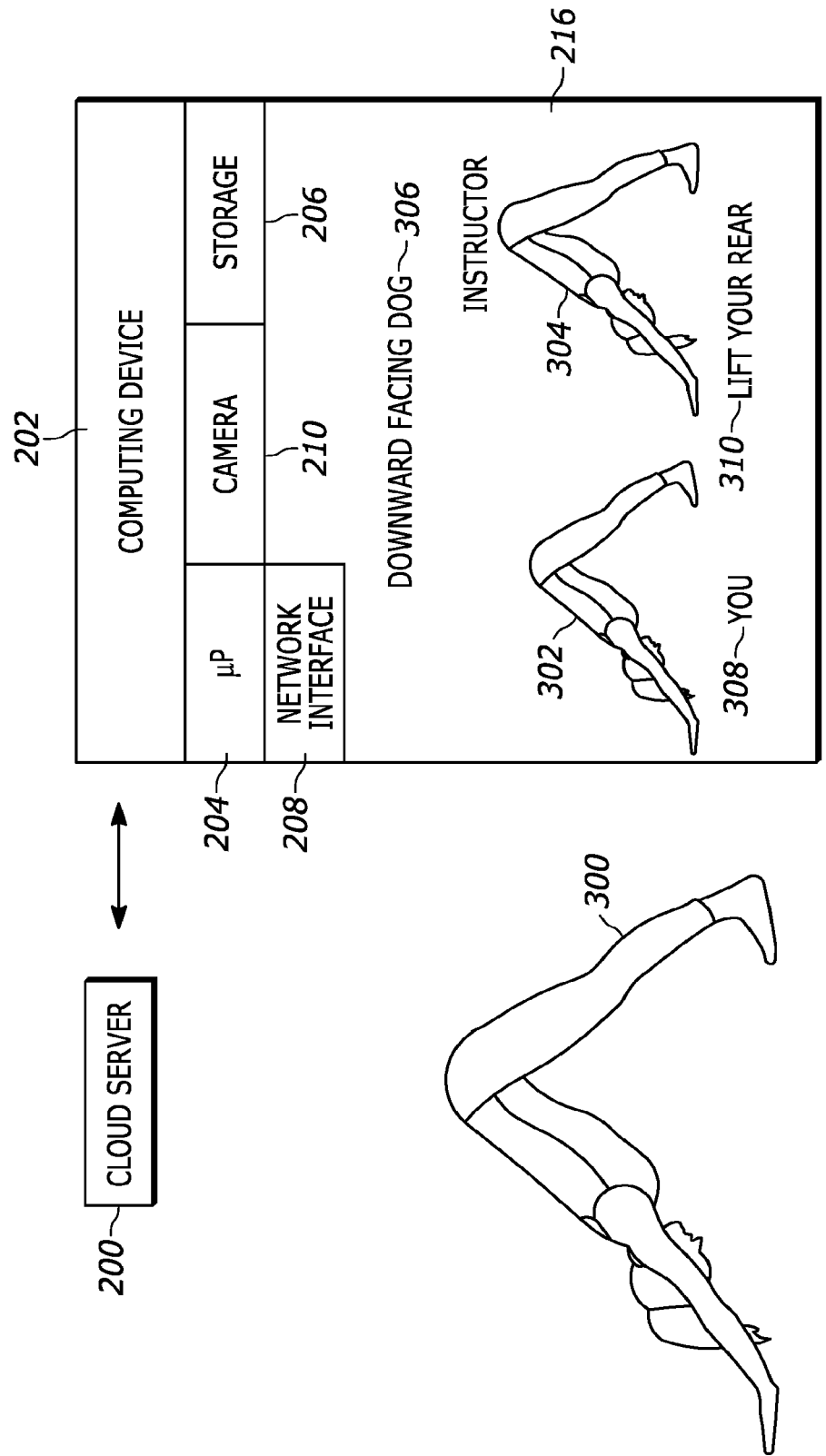
FIG. 3 schematically shows a person in a yoga pose and a block diagram of an accompanying computing device to help train the person.

FIG. 3 shows another example use case of present principles in which a person 300 is executing a yoga pose, in the example shown, downward facing dog. An image 302 of the person 300 executing the yoga pose as taken by the camera 210 may be presented on the display 216 along with an image 304 of a ground truth representation of the pose. The name of the pose may be indicated at 306 as derived using neural networks analyzing the image 302 as described further below. Labels 308 may be provided for the images 302, 304 as shown. An indication 310 of the deviation from ground truth of the person's pose/movement may also be presented on the display 216. In the example shown, the indication 310 is alpha-numeric advice, in this case, "lift your rear", it being understood that other forms of the indication including graphical, audible, and tactile may be provided. The indication 310 may be derived using one or more neural networks discussed further below and analyzing the image of the person.

Figure 4:
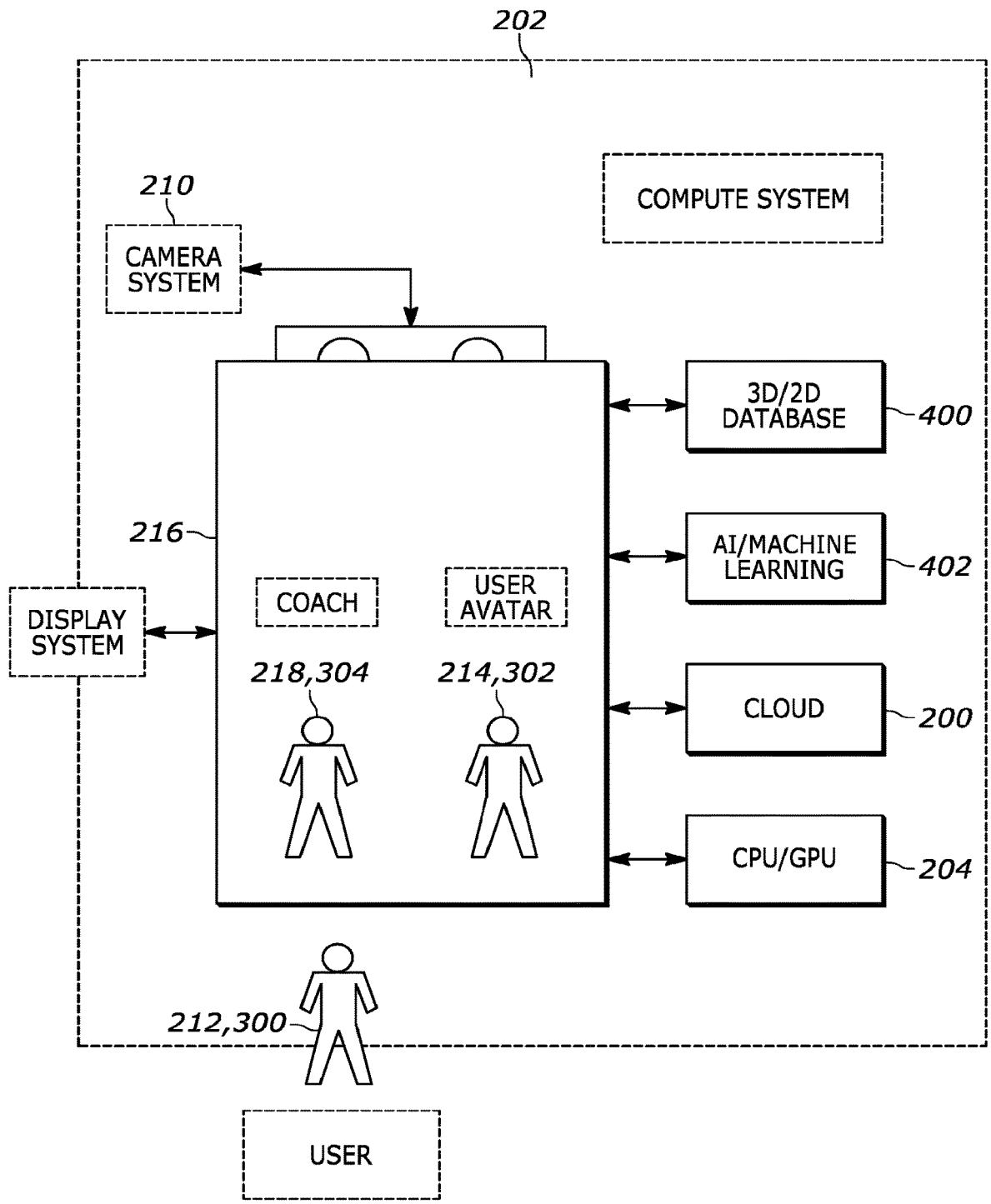
FIG. 4 is a block diagram of a combined hardware/software architecture consistent with present principles.

FIG. 4 shows a block diagram of combined hardware and software consistent with disclosure above. In the example shown, note that the camera 210 is depicted as a camera system separate from the computing device 202. The camera system 210 may be a fusion camera sensor that combines images from a red-green-blue (RGB) imager, a depth imager such as a laser imager, and a thermal imager such as an infrared (IR) imager.

The processor 204 (which may include a combined central processing unit/graphics processing unit) may access a local or remote database 400 of two dimensional (2D) and/or 3D still and/or video images and may execute an application 402 that helps the user train his or her body to assume correct poses/motions. The database 400 may be provided or sourced from a service that provides images and videos of experts executing various athletic tasks such that the user can where user can discover ground truth poses from experts. The service may be accessed for free or upon payment, e.g., a subscription. The service may be accessed on a trial basis as well as provide social features of friends making recommendations and progress reports in similar endeavors.

The application 402 may include machine learning components including neural networks. The application 402 may present on the display 216 images 218, 304 of poses/motions from experts ("ground truth") as described above to enable the user to follow along and match the user's poses to that of the experts and to accurately determine faults in the user's poses/motions.

The application 402 and/or other neural networks described herein overcome two problems that might arise were only a naïve angle-by-angle comparison to be used of a pose with respect to a reference pose, by e.g. simply comparing rotations of joints one by one. Such an approach does not account for individual body differences or for how acceptable variations of the same pose may be with respect to deviations to a reference pose. Challenge (1) means that two different people may have to perform the same pose differently, while the pose is still considered equally correct for the purposes of the activity. Challenge (2) means that some poses may be more sensitive than others with respect to angular variations at some joints; the sensitivity may vary depending on the direction of variation; some poses may also be completely insensitive with respect to variation at some joints.

In contrast, similarity learning provides a machine learning-based solution to the problem, by producing a data-driven similarity metric as disclosed further below that makes sense in the application domain. Given a training set consisting of multiple coaches performing a set of poses, as well as non-experts performing the same poses, a similarity metric is learned by using a triplet loss imposing that the distance according to the metric is zero when two coaches are performing the same pose, that is as high as possible when two different poses are performed (irrespective of the user), and that, when non-experts are performing the same poses as experts, it is higher than experts performing the same pose as experts but lower than when performing a different pose. This metric can then be used to evaluate pose correctness.

This addresses both the above challenges: by using data coming from multiple coaches, the metric is robust against individual body differences; by comparing experts and non-experts across multiple different poses, it is contextual, and it learns what different and equal means in the target domain.

Figure 5:
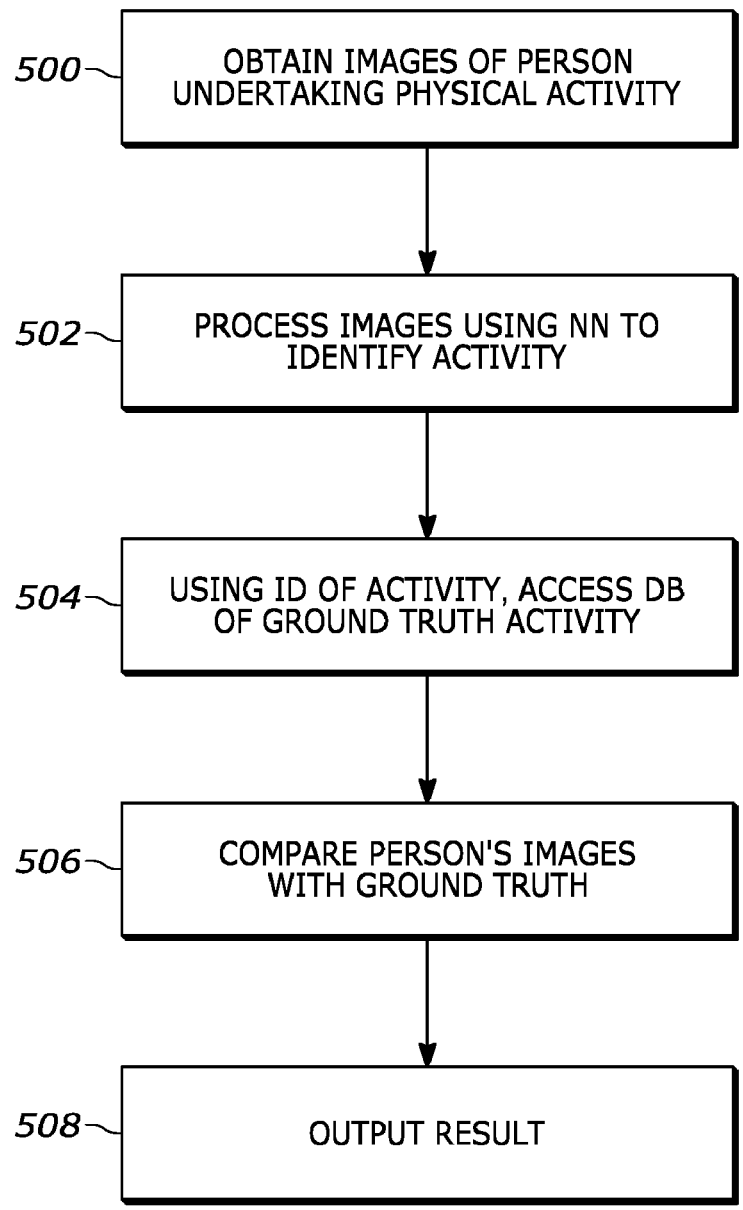
FIG. 5 is a flow chart of example logic consistent with present principles.

FIG. 5 illustrates example overall logic consistent with present principles. Commencing at block 500, images such as video images of a person undertaking a physical activity such as the above-described golf setup or yoga pose are obtained using real time simple optical capture. In some embodiments the person is not required to wear any special image capture tags or suits including passive tags such as retroreflectors or active tags such as light emitting diodes (LED).

Moving to block 502, the video images are processed using at least one neural network to identify a type of the physical activity. Proceeding from block 502 to block 504, using the type of physical activity a database is accessed to access ground truth representation of the activity. The person's images are compared at block 506 with ground truth and the result of the comparison is output at block 508. The processing of FIG. 5 is done in real time so that the person can view the results of the comparison virtually simultaneously (within processing time constraints) with undertaking the physical activity.

Figure 6:
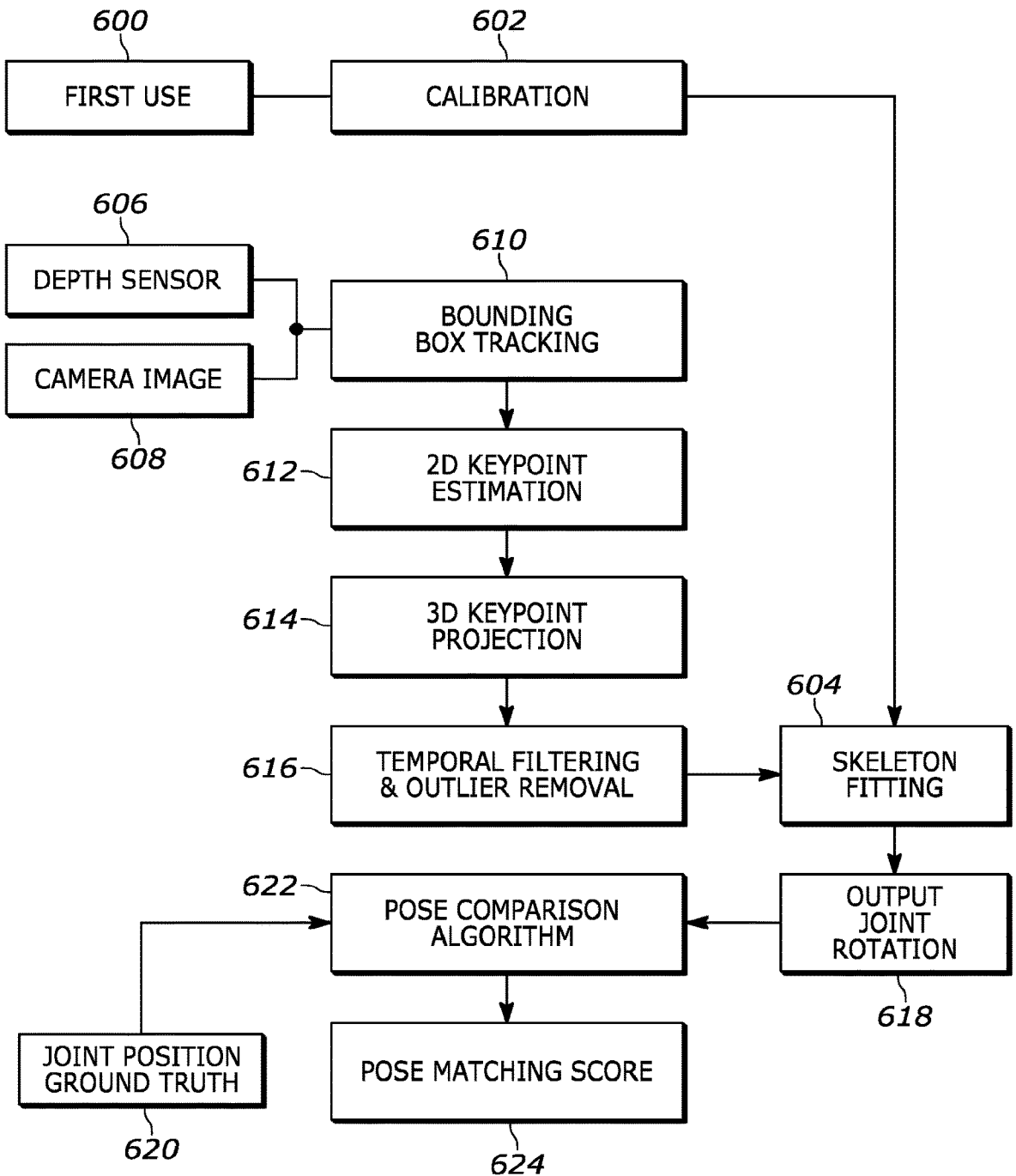
FIG. 6 is a flow chart illustrating details of an example neural network implementation.

Refer now to FIG. 6 for details of an example implementation by one or more neural networks (NN) to output the result at block 508 in FIG. 5. Commencing at block 600 for the first use of the NN, calibration is performed at block 602 using a training set of poses that includes images of both ground truth poses and known "faulty" poses. Skeleton fitting may then be executed at block 604 for subsequent uses of the NN. Block 604 is described further below.

Such subsequent uses may begin by receiving images from a depth sensor 606 (such as, e.g., a laser scanner) and a camera 608, both of which may be part of the camera system 210 described previously. Bounding box tracking is executed on the images at block 610. Essentially, image recognition is used to identify objects within the images and in particular human objects, along with sub-objects such as hands, feet, upper arms, lower arms, upper leg, lower leg, torso, head.

Based on the bounding box tracking at block 610, the logic moves to block 612 to estimate two dimensional keypoints in the objects and sub-objects. Such keypoints may include joints, for example. From the 2D keypoints, 3D keypoints are projected at block 614. In other words, block 614 projects the 2D keypoints from block 612 into three-dimensional space as modeled in computer memory.

Moving to block 616, temporal fitting is performed to associate keypoint locations with a common time, such that a first set of keypoint locations is associated time 0, a second set of keypoints is associated with time 1, and so on. Outlier keypoint locations are also pruned. For example, keypoint locations of an upper arm should lie in a general line, and any keypoint locations not in the line within a tolerance are removed.

Skeleton fitting then occurs at block 604. Essentially, the 3D keypoint locations are used to construct a skeleton of the imaged human, since pose relates typically to skeletal pose and it is desired that analysis is unencumbered by consideration of non-skeletal body portions. Once the skeletal pose is fit at block 604, joint rotations are output at block 618 indicating the locations and orientations of body joints. Joint position ground truth (e.g., pose information derived from experts performing the pose under analysis) is identified at block 620 and at block 622 is compared with the output representing the user image from block 618. Based on the comparison, e.g., point by point, pixel by pixel, joint by joint, etc., a match score is output at block 624. This match score may be output for each sub-object in the human image and used to derive recommendations such as the examples shown in FIGS. 2 and 3 and described above.

Figure 7:
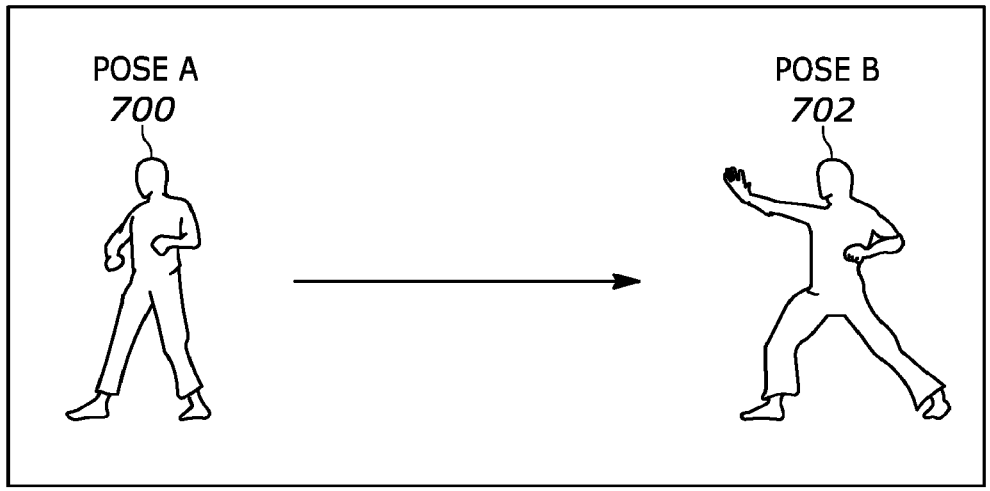
FIG. 7 schematically illustrates a pose to pose movement to be evaluated.
Figure 8:
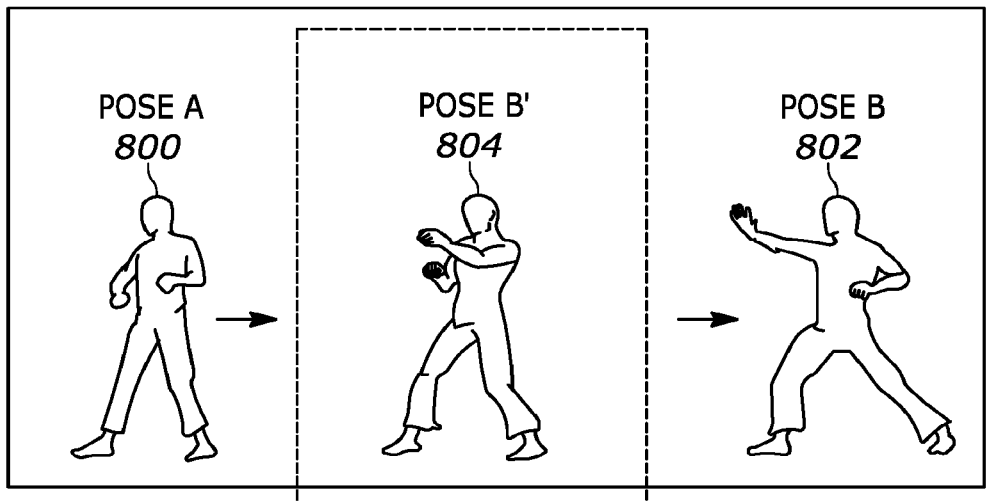
FIG. 8 schematically illustrates a ground truth sequence of poses related to FIG. 7.
Figure 9:
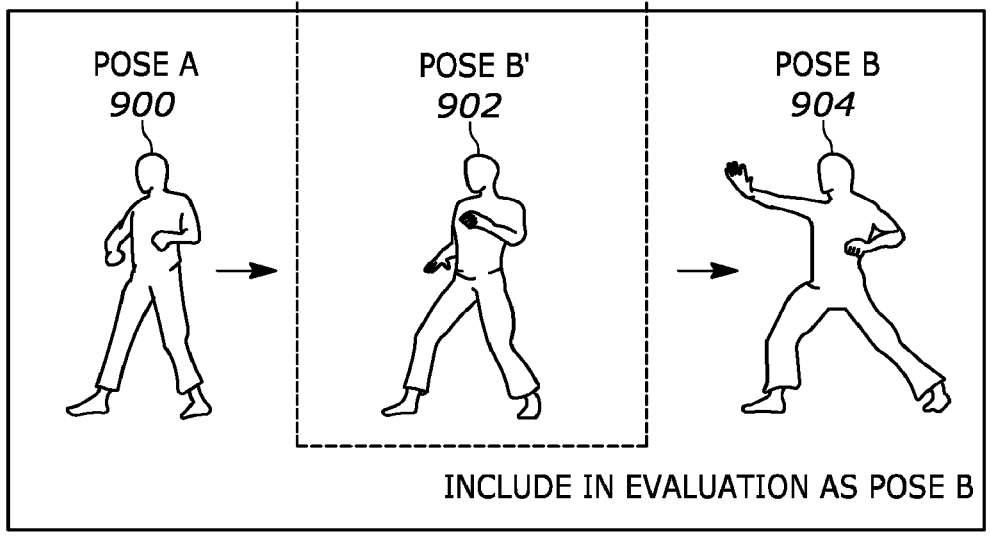
FIG. 9 schematically illustrates a ground truth sequence of poses to be evaluated related to FIGS. 7 and 8.

Refer to FIGS. 7-9 for further illustration. FIG. 7 illustrates a person executing an initial TaiChi or karate pose 700 that the person transitions from to a final pose 702. FIG. 8 illustrates a ground truth (expert or instructor) executing the same initial pose 800 as executed at 700 in FIG. 7, transitioning to the same final pose 802 as executed at 702 in FIG. 7, with one or more intermediate body positions 804 (only a single intermediate body position shown for clarity) being moved through from the initial pose 800 to the final pose 802.

FIG. 9 illustrates that a person for whom instruction is intended may subsequently attempt to execute the initial pose 900 and transition through intermediate positions 902 to the final pose 904 and may indeed succeed in correctly arriving at both poses 900, 904. However, one or more of the intermediate positions 902 may deviate from the corresponding ground truth intermediate positions 804 as shown. Present principles identify such deviation and provide the above-described output to alert the person executing the motion in FIG. 9 as to the better "ground truth" sequence of body positions as reflected in the ground truth sequence of FIG. 8. If the motion capture data contains characteristic motion information between the initial pose and final pose, the extracted pose may be added as the intermediate position and the evaluation may be included in the final pose as a continuous pose.

It will be appreciated that whilst present principals have been described with reference to some example embodiments, these are not intended to be limiting, and that various alternative arrangements may be used to implement the subject matter claimed herein.

What is claimed is:

1. A system comprising:
   at least one processor configured with instructions executable by the processor to:
   obtain video images of a person undertaking a physical activity;
   process the video images using at least one neural network to identify a type of the physical activity;
   based at least in part on the type of physical activity, access at least one ground truth representation comprising at least one image of a coach undertaking the physical activity;
   compare the physical activity undertaken by the person as captured in the video images to the ground truth representation;
   output a human-perceptible result of the comparison of the physical activity undertaken by the person as captured in the video images to the ground truth representation; and
   present on at least one display an image of the person undertaking the physical activity juxtaposed with the at least one image of the coach undertaking the physical activity along with presenting the human-perceptible result of the comparison of the physical activity.

2. The system of claim 1, wherein the instructions are executable to:
   obtain the video images of the person undertaking the physical activity using real time simple optical capture of video images of the person.

3. The system of claim 2, wherein the instructions are executable to identify the type of the physical activity without the person wearing passive or active image capture tags.

4. The system of claim 1, wherein the at least one neural network is trained using a set comprising at least two coaches performing a set of poses, as well as at least two non-experts performing the poses, to learn a similarity metric associated with a distance that is zero when two coaches are performing a same pose, that is a first value when two different poses are performed, and that, when non-experts are performing the poses, is a second value less than the first value and greater than zero, the similarity metric being used to evaluate pose correctness.

5. The system of claim 1, wherein the instructions are executable to identify the physical activity as golf or TaiChi or karate.

6. The system of claim 1, wherein the instructions are executable to obtain the video images from a fusion camera system comprising a red-green-blue (RGB) imager and at least one of a depth imager or a thermal imager or both a depth imager and a thermal imager.

7. The system of claim 1, wherein the ground truth representation is stored in at least one database of images of experts executing ground truth activities.

8. The system of claim 7, wherein the database provides friends recommendations and progress reports in similar endeavors.

9. The system of claim 1, wherein the human-perceptible result of the comparison of the physical activity undertaken by the person as captured in the video images to the ground truth representation comprises a first image on a display of ground truth poses/motions from at least one expert and at least a second image of the user undertaking the physical activity.

10. The system of claim 1, wherein the instructions are executable to output the human-perceptible result of the comparison in real time such that the person can view the result of the comparison simultaneously within processing time constraints with undertaking the physical activity.

11. A method comprising:
    obtaining video images of a person undertaking a physical activity;
    accessing at least one ground truth representation of the physical activity; and
    displaying a human-perceptible result of a comparison of the physical activity undertaken by the person as captured in video images to the ground truth representation, wherein the method comprises considering that (1) two different people having to perform a first pose differently, while the first pose is still considered equally correct for the purposes of the physical activity, and (2) some poses are more sensitive than other poses with respect to angular variations at some joints.

12. The method of claim 11, comprising:
    obtaining the video images of the person undertaking the physical activity using real time simple optical capture of video images of the person.

13. The method of claim 12, comprising identifying the type of the physical activity without the person wearing passive or active image capture tags.

14. The method of claim 11, comprising identifying the physical activity as yoga.

15. The method of claim 11, comprising identifying the physical activity as golf.

16. The method of claim 11, comprising outputting the human-perceptible result of the comparison in real time such that the person can view the result of the comparison simultaneously within processing time constraints with undertaking the physical activity.

* * * * *